United States Patent
Bearss et al.

[11] Patent Number: 5,987,221
[45] Date of Patent: Nov. 16, 1999

[54] ENCODED ORPHAN PIXELS FOR DISCRIMINATING HALFTONE DATA FROM TEXT AND LINE ART DATA

[75] Inventors: James G Bearss; Eugene A Roylance; Terry M. Nelson; Arlin R Jones, all of Boise, Id.

[73] Assignee: Hewlett-Packard Company, Palo Alto, Calif.

[21] Appl. No.: 08/788,768

[22] Filed: Jan. 24, 1997

[51] Int. Cl.[6] .............................. G06K 9/34; G06K 15/02; G06K 9/44; H04N 1/409

[52] U.S. Cl. .......................... 395/109; 382/176; 382/266; 358/462; 358/447

[58] Field of Search ............................ 395/109; 382/176, 382/237, 261, 270, 254, 173; 358/462, 456, 465, 466, 298; 347/131

[56] References Cited

U.S. PATENT DOCUMENTS

| | | | |
|---|---|---|---|
| 4,750,209 | 6/1988 | Shimura et al. | 382/176 |
| 4,847,641 | 7/1989 | Tung | 347/131 |
| 5,742,703 | 4/1998 | Lin et al. | 382/176 |
| 5,764,812 | 6/1998 | Sakano | 382/261 |
| 5,784,500 | 7/1998 | Homma et al. | 382/270 |
| 5,832,141 | 11/1998 | Ishida et al. | 358/462 |
| 5,848,185 | 12/1998 | Koga et al. | 382/173 |

*Primary Examiner*—Scott Rogers
*Attorney, Agent, or Firm*—Lane R. Simmons

[57] ABSTRACT

Text and line art image data is distinguished from halftone image data for selectively enhanced rendering thereof. Specifically, a method of rendering a raster pixel image from a stored bitmap includes (i) determining whether an orphan pixel is detected within a bounded sampling window of the bitmap, and, (ii) processing at least one selected pixel of the bitmap within the sampling window relative to the determining of whether an orphan pixel is detected. In general, an orphan pixel is defined as an isolated white or black pixel in a halftone image. In one embodiment, an orphan pixel is recognized as having a predefined pixel value and as having no other pixels with that value adjacent thereto within the sampling window. In the event an orphan pixel is detected within the window, then the bitmap within the window is determined to be halftone image data and the selected pixel is processed accordingly. In the event an orphan pixel does not exist within the window, then the bitmap within the window is recognized as text or line art image data and processed respectively. In addition, a method of forming a dither matrix for a halftone image includes generating a pixel pattern such that an orphan pixel exists within the pattern of the dither matrix. The orphan pixel is designed into the halftone image. This measure increases the probability that orphan pixels will exist and be detected in the resultant raster image array. Thus, during subsequent rendering of the raster pixel image, selective application of resolution enhancement techniques may occur based on whether or not an orphan pixel is detected in the sampling window.

22 Claims, 5 Drawing Sheets

ENCODED ORPHAN PIXELS FOR DISCRIMINATING HALFTONE DATA FROM TEXT AND LINE ART DATA

FIELD OF THE INVENTION

This invention relates in general to imaging systems and pixel resolution enhancement and, more particularly, to rendering of complex images having text, line art, and/or halftones.

BACKGROUND OF THE INVENTION

Electrophotographic processes for producing a permanent image on media are well known and commonly used. In general, a common process includes: (1) charging a photoreceptor such as a roller or continuous belt bearing a photoconductive material; (2) exposing the charged area to a light image to produce an electrostatic charge on the area in the shape of the image; (3) presenting developer particles (toner) to the photoreceptor surface bearing the image so that the particles are transferred to the surface in the shape of the image; (4) transferring the particles in the shape of the image from the photoreceptor to the media; (5) fusing or fixing the particles in the shape of the image to the media; and (6) cleaning or restoring the photoreceptor for the next printing cycle. Many image forming apparatus, such as laser printers, copy machines, and facsimile machines, utilize this well known electrophotographic printing process.

In laser printers, an image is typically rasterized to form a bit pattern which is stored as a binary image bitmap for subsequent rendering to a final output image. The image bitmap is also referred to as a picture element ("pixel") raster image. In the rasterizing process (i.e., forming the binary bitmap), graphic elements, such as continuous lines (line art) and text character outlines are converted to pixel patterns that approximate the source image shape. Continuous tone data, such as photographic data (both color and gray value images) are also converted to pixel patterns that approximate the source continuous tone image data. However, to effectively portray the original source image for continuous tone data, each pixel of the source image must be represented by multiple bits which define either a color or a gray level and which are subsequently converted, typically, to a binary image bitmap. Hereafter, it is to be understood that when the term "gray" is used, it applies to both color and black/white images and, when applied to a color image, relates to the intensity of the color.

Conventionally, in order to represent gray level images on a bi-level (black and white) printer, the pixel data, if not already gray level, is converted into a gray level, multi-bit configuration. For example, when a multi-bit configuration of 8 bits per pixel is employed, 256 gray levels can be represented by the digital pixel values. The individual gray level pixels are converted to binary level pixels (i.e., bi-level data for subsequent rendering) through the use of a dithering process. Spatial dithering (or digital halftoning) is the converting of the multi-bit pixel values (of a source image) to fixed-size, binary, multi-pixel groupings that approximate the average gray value of the corresponding source data. This dithering process provides a halftone texture to selected areas of the image so as to provide gray value variations therein. Thus, for example, with binary pixels, a 6×6 multi-pixel grouping can, in theory, simulate 36 levels of gray, and an 8×8 grouping can simulate 64 levels.

The dithering process (i.e., halftoning) employs a comparison of the individual pixel values (specified by a source image intensity array) against a threshold matrix (dither matrix or device best threshold array) to control the conversion of the gray level values to appropriate patterns of bi-level data. For purposes of this discussion, a gray level value of 255 in a source image is considered to be "white", and a gray level value of 0 is "black". The threshold matrix comprises a plurality of row-arranged gray level values which control the conversion of the gray level pixel values to bi-level pixel values which are stored in a resultant page buffer array (raster) bitmap. During the dithering process, the threshold matrix is tiled across the image pixels to enable each gray level image pixel to be compared against the correspondingly, logically-positioned gray level value of the threshold matrix. In essence, each entry in the threshold matrix is a threshold gray level value which, if exceeded by the source image gray level pixel value, causes that gray level image pixel to be converted to a "white" pixel (or a binary logical "zero"). If, by contrast, the source image gray level pixel value is less than or equal to the corresponding threshold matrix gray level value, it is converted to a "black" pixel (or a binary logical "one", i.e., a complementary or opposite pixel value relative to "zero").

Thus far, the discussion has focused on the differences between rasterizing text (or line art) and halftone images. However, in either case, once a raster page buffer array bitmap is generated from a source image, whether the image is text, line art, or halftone, the desired output image is created (rendered) by causing a laser to be modulated in accordance with the bit pattern stored in the image page buffer array bitmap. The modulated laser beam is scanned across a charged surface of a photosensitive drum in a succession of raster scan lines. Each scan line is divided into the pixel areas and the modulated laser beam causes some pixel areas to be exposed to a light pulse and some not, thus causing a pattern of overlapping pixels on each scan line. Where a pixel area is illuminated, the photosensitive drum is discharged, so that when it is subsequently toned, the toner adheres to the discharged areas and is repelled by the still charged areas. The toner that is adhered to the discharged areas is then transferred to paper and fixed in a known manner.

In general, the fidelity of the output image relative to the source data is directly related to the resolution of pixels (dots) in the output image. Arbitrary analog images cannot be exactly reproduced by a bitmap raster. For example, as a result of the images's pixel configuration, image edges that are either not parallel to the raster scan direction or not perpendicular to it appear stepped. This is especially noted in text and line art.

Various techniques have been developed to improve the quality of the output image of a raster bitmap. These enhancement techniques include: edge smoothing, fine line broadening, antialiasing (to smooth jagged edges), and increasing the resolution of the laser printer. These enhancing techniques typically modify the signals to the laser to produce smaller dots that are usually offset from the pixel center, or in other words, to produce gray scale dots. However, most of the enhancing techniques operate on the data after it has already been rasterized, and hence after the fine detail has already been lost. Thus, most enhancing techniques employ interpolation methods upon the raster data to "best" render the image.

As an example, although the prior art has attempted in a variety of ways to overcome the stepped appearance of pixel image edges for text and line art, one of the more widely used techniques is described in U.S. Pat. No. 4,847,641 to Tung, assigned to the Assignee of this application, the disclosure of which is incorporated in full herein by reference. Tung discloses a character generator that produces a bitmap of image data and inputs that bitmap into a first-in first-out (FIFO) data buffer. A fixed subset of the buffer stored bits forms a sampling window through which a selected block of the bitmap image data may be viewed (for example, a 9×9 block of pixels with the edge pixels truncated). The sampling window contains a center bit cell which changes on each shift of the image bits through the FIFO buffer. As the serialized data is shifted, the sampling window views successive bit patterns formed by pixels located at the window's center bit cell and its surrounding neighbor bit cells. Each bit pattern formed by the center bit and its neighboring bits is compared in a matching network with prestored templates. If a match occurs, indicating that the center bit resides at an image edge and that the pixel it represents can be altered so as to improve the image's resolution, a modulation signal is generated that causes the laser beam to alter the center pixel configuration. In general, the center pixel is made smaller than a standard unmodified bitmap pixel and is possibly moved within the confines of the pixel cell. The pixel size alteration is carried out by modulating the laser contained in the "laser print engine" of the laser printer. The system taught by Tung is now generally referred to as Resolution Enhancement Technology (RET) and enables substantially improved image resolutions to be achieved for text and line art.

Although conventional pixel resolution enhancement techniques work well for edge smoothing of text and line art images, the techniques are not really intended for halftone images. Namely, there are generally not discrete "edges" in halftone images that are to be smoothed. Thus, when complex images that include both text (or line art) and halftone are processed through a resolution enhancement technique, the text or line art is enhanced (edges are smoothed) but the halftone image quality may in fact be diminished. The high frequency nature of any halftone image (i.e., the black to white transitioning) may especially be undesirably altered as a result of RET. This is because RET (or edge smoothing) is, conventionally, applied to the entire raster image, regardless of whether the data (pixel pattern) is representative of text, line art, or halftone images. Text (or line art) simply has not been distinguishable, and has not been distinguished, from halftone images in raster arrays for any kind of selective application of such resolution enhancement techniques.

Accordingly, an object of the present invention is to improve the rendering of complex images embodying text, line art and/or halftone data.

SUMMARY OF THE INVENTION

According to principles of the present invention in a preferred embodiment, text and line art image data is distinguished from halftone image data for selectively enhanced rendering thereof. Specifically, a method of rendering a raster pixel image from a stored bitmap includes (i) determining whether an orphan pixel is detected within one or more bounded sampling windows of the bitmap, and, (ii) processing at least one selected pixel of the bitmap within the one or more sampling windows relative to the determining of whether an orphan pixel is detected. In general, an orphan pixel is defined as an isolated white or black pixel in a halftone image. In one embodiment, an orphan pixel is recognized as having a predefined pixel value and as having no other pixels with that value adjacent thereto within a sampling window. In the event an orphan pixel is detected, then the bitmap within the window or windows is determined to be halftone image data and the selected pixel is processed accordingly. In the event an orphan pixel is not detected, then the bitmap within the window or windows is recognized as text or line art image data and processed respectively.

According to further principles, a method of forming a dither matrix for a halftone image includes generating a pixel pattern such that an orphan pixel exists within the pattern of the dither matrix. The orphan pixel is designed into the halftone image. This measure increases the probability that orphan pixels will be detected in the resultant raster image array. Thus, during subsequent rendering of the raster pixel image, selective application of resolution enhancement techniques may occur based on whether or not an orphan pixel is detected in the sampling window or windows.

Other objects, advantages, and capabilities of the present invention will become more apparent as the description proceeds.

DETAILED DESCRIPTION OF THE INVENTION

Figure 1:
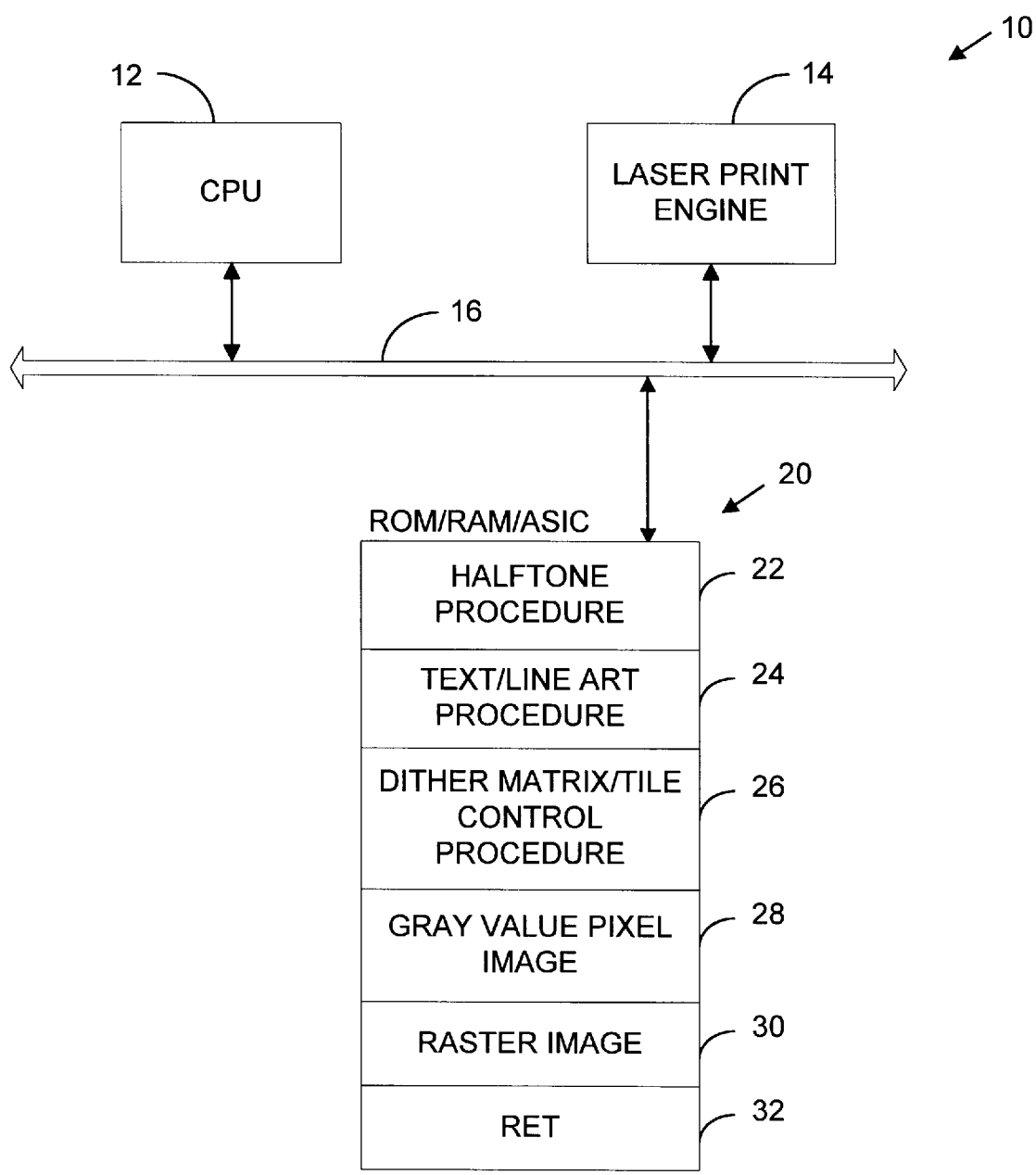
FIG. 1 is a block diagram of a laser print engine incorporating the invention hereof.

FIG. 1 is a block diagram of a laser printer that incorporates the invention hereof for enhanced rendering of a source image by discriminating between text/line art and halftone images based on orphan pixel data. It is to be understood that while a laser printer will be hereafter described, the invention is equally applicable to any device which utilizes multiple gray level pixels (as applicable to black/white or color) to render a halftone image. More specifically, such devices include laser printers, copiers, facsimile devices, plotters, inkjet based devices, etc.

Laser printer 10 comprises a central processing unit (CPU) 12 and laser print engine 14, interconnected via a bus 16. A read only memory (ROM) and/or random access memory (RAM) and/or application-specific integrated circuit (ASIC) 20 is/are interconnected to bus 16. For simplicity of illustration and discussion purposes, ROM/RAM/ASIC 20 is shown as a single block unit although as is well known in the art they are generally separate units for providing specific functionalities. It is also to be understood that the rendering/rasterizing procedures and data discussed herein for printer 10 may be maintained and utilized as control firmware in any conventional ROM, and/or implemented in an ASIC for high-speed hardware functionality, and/or implemented in connection with RAM for storage and buffering purposes.

ROM/RAM/ASIC 20 includes procedures and data necessary to enable CPU 12 to carry out the rasterizing, halftoning and rendering functions of the invention. More specifically, ROM/RAM/ASIC 20 includes a halftone procedure 22, text and line art procedure 24, dither matrix and tile control subprocedure 26, and a gray value pixel image 28 (as received from a host processor, not shown) which is to be altered by the invention into a raster image 30, suitable for rendering by laser print engine 14. Halftone raster image 30 may be buffered in RAM or fed directly from an ASIC to print engine 14. Resolution enhancement technology (RET) procedure 32 provides edge smoothing for text and line art stored within raster image 30 upon final rendering.

Gray value pixel image 28 is of the known type wherein each pixel is represented by a multi-bit gray value. If gray value pixel image 28 is a color image, it will comprise (generally) four color planes with three of the color planes representing cyan, magenta and yellow color values (or red, green and blue color planes). Moreover, each color value in each plane may be represented by a predetermined number of bits—for example, by 8 bits. A fourth plane, representing black, may be comprised of single or multiple bit values at each pixel location where a black or gray scale image value is to appear on the ultimate rendered output. Thus there may be a total of 25 to 32 bits per pixel in gray value pixel image 28 if color is embodied. On the other hand, if gray value pixel image 28 is a non-color image, each pixel may, for example, be represented simply by 8 bits to depict 256 levels of gray as well known in the art. Other bit depths and color planes, such as in hi-fi printing, are equally applicable in the present invention, as will be obvious to those of ordinary skill in the art.

The object of halftone procedure 22 (along with dither matrix/tile control subprocedure 26) is to convert any continuous tone image within gray value pixel image 28 into a halftoned raster image 30. Text/line art procedure 24 also converts any text and line art images within gray value pixel image 28 into raster image 30. Under principles of the present invention, "orphan" dots are embodied within raster image 30 in connection with halftone image data to provide a means for distinguishing the halftone data from text/line art data. In general, an "orphan" dot is defined as an isolated white or black dot/pixel in a halftone image. Thus, upon subsequent rendering of raster image 30, halftone images are recognized by the orphan dots and, as such, the halftone images are not passed through RET procedure 32, thereby avoiding potential degrading of the halftone images. Rather, the halftone images may be passed through a specific halftone enhancement procedure (not shown). On the other hand, text and line art data is recognized by the absence of orphan dots in the raster image. Consequently, text and line art data is selectively passed through RET procedure 32 for edge smoothing purposes. This discrimination between text/line art and halftone data using orphan dots will be discussed more completely as the description proceeds.

Figure 2:
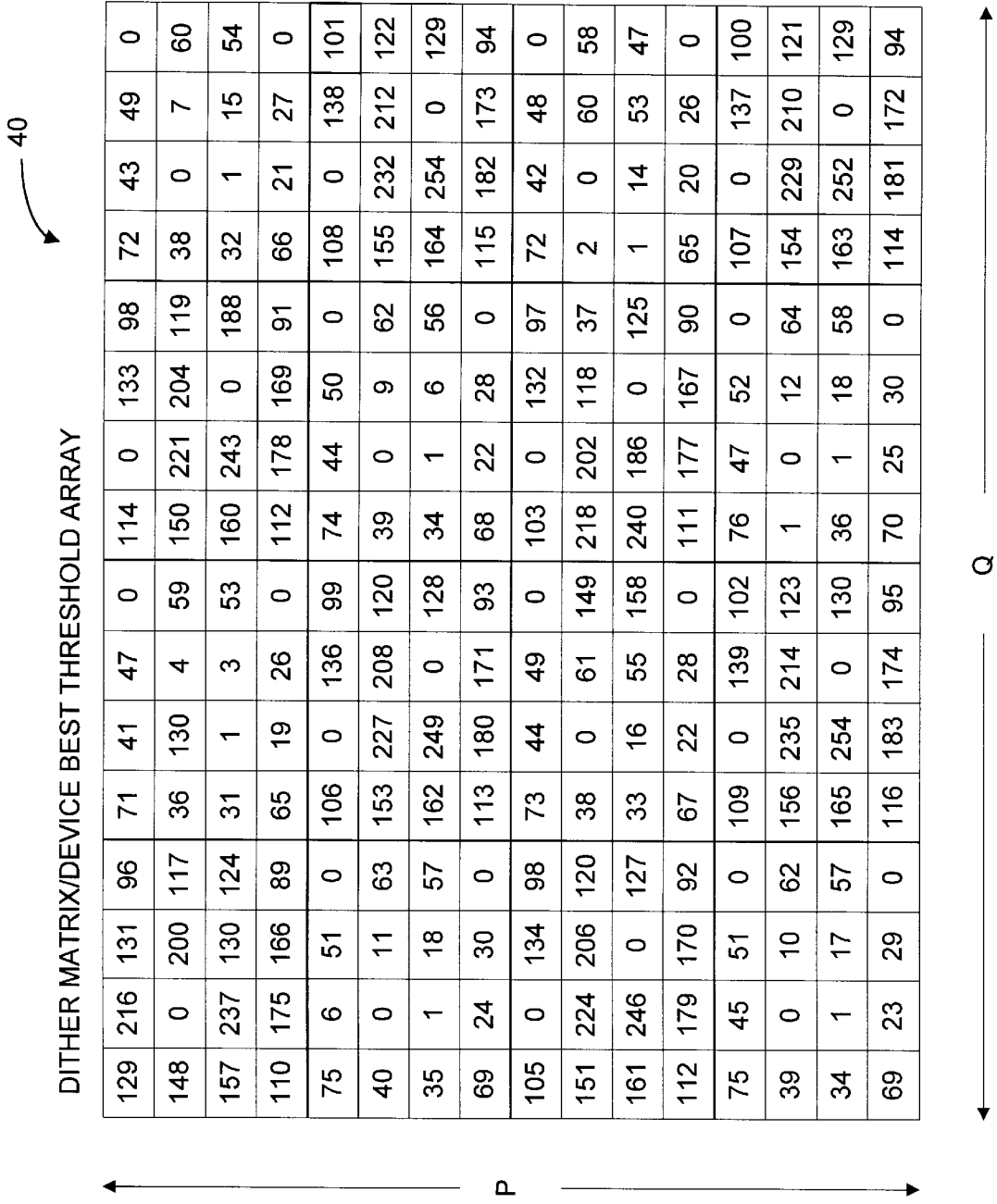
FIG. 2 is a block diagram of a threshold dither matrix embodying orphan pixels according to the present invention.

FIG. 2 is a block diagram of a threshold dither matrix (device best threshold array) 40 according to the present invention. Dither matrix 40 comprises a P×Q matrix (in this example, 16×16) of threshold values. Again, for purposes of this discussion, a source image gray level pixel value of 255 is considered to be "white", and a source image gray level value of 0 is "black". Thus, each threshold value in each cell of dither matrix 40 represents a level which must be exceeded by a positionally corresponding source image pixel value from gray value pixel image 28 for that image pixel value to be represented by a "white" halftone pixel in raster image 30. Or, in other words, if a threshold matrix 40 pixel value is less than a source image 28 pixel value, then a "white" pixel is set in resultant raster image 30. In contrast, if the dither matrix pixel exceeds the positionally corresponding image pixel value, then that image pixel value is converted to a "black" halftone pixel in raster image 30.

The arrangement of threshold values in dither matrix 40 is defined by conventional criteria in addition to the use of "orphan" pixels specific to the present invention. In this exemplary matrix, orphan pixels are defined as having a zero (0) value although others may also exist, depending on adjacent pixel values. The criteria for establishing dither matrix 40 includes: (i) establishing an adequate number of gray levels for image quality; (ii) utilizing a mapped gamma (indicative of how fast the gray steps change); (iii) minimizing visible patterning in the gray ramp; (iv) ensuring the pattern is robust to RET degradation (i.e., ensuring that the halftone data will withstand unwanted application of RET, although this aspect is less critical under principles of the present invention because of the use of "orphan" dots); and (v) including an appropriate number of "orphan" pixels (dots) to ensure detection of the same in the subsequent rasterized array and to enable switching between RET template matching and halftone template matching during rendering. Essentially, orphan pixel placement is based on a tradeoff evaluation of all threshold dither criteria discussed, including optimization and line screen issues, and the number of sampling/detection windows used for switching during rendering. The sampling/detection windows will be discussed more fully later.

Dither matrix 40 provides an exemplary 16×16 super cell that produces a 106 line per inch (Ipi)—600 dot per inch (dpi) binary image. The zero (0) values indicate the resultant raster pixel will stay "white", no matter the source image pixel value upon rasterizing of gray value pixel image 28. The zero (0) values are strategically placed within the matrix per the previously discussed criteria to serve as orphan pixels/dots (or to enhance the existence/detection of orphan pixels) for a 3×3 mapping (rasterizing) window. Although an "orphan" pixel, in this example, is any dither matrix pixel having a predefined value of zero (0), other predefined values would likewise suffice given the proper mapping and recognition of the same. The orphan pixels are placed in dither matrix 40 to enhance the possibility of having orphan pixels in the resultant raster image 30 for ultimate purposes of discriminating text/line art data from halftone data during rendering. As will be understood by those of ordinary skill in the art, the placement of orphan pixels in FIG. 2 is merely exemplary, and variations may also serve for a 3×3 sampling/detection window. Moreover, the orphan placement may also vary given a different size window, such as for a 5×5 area window, a 1×3 area window, or for a multiple sampling/detection window configuration.

Figure 3:
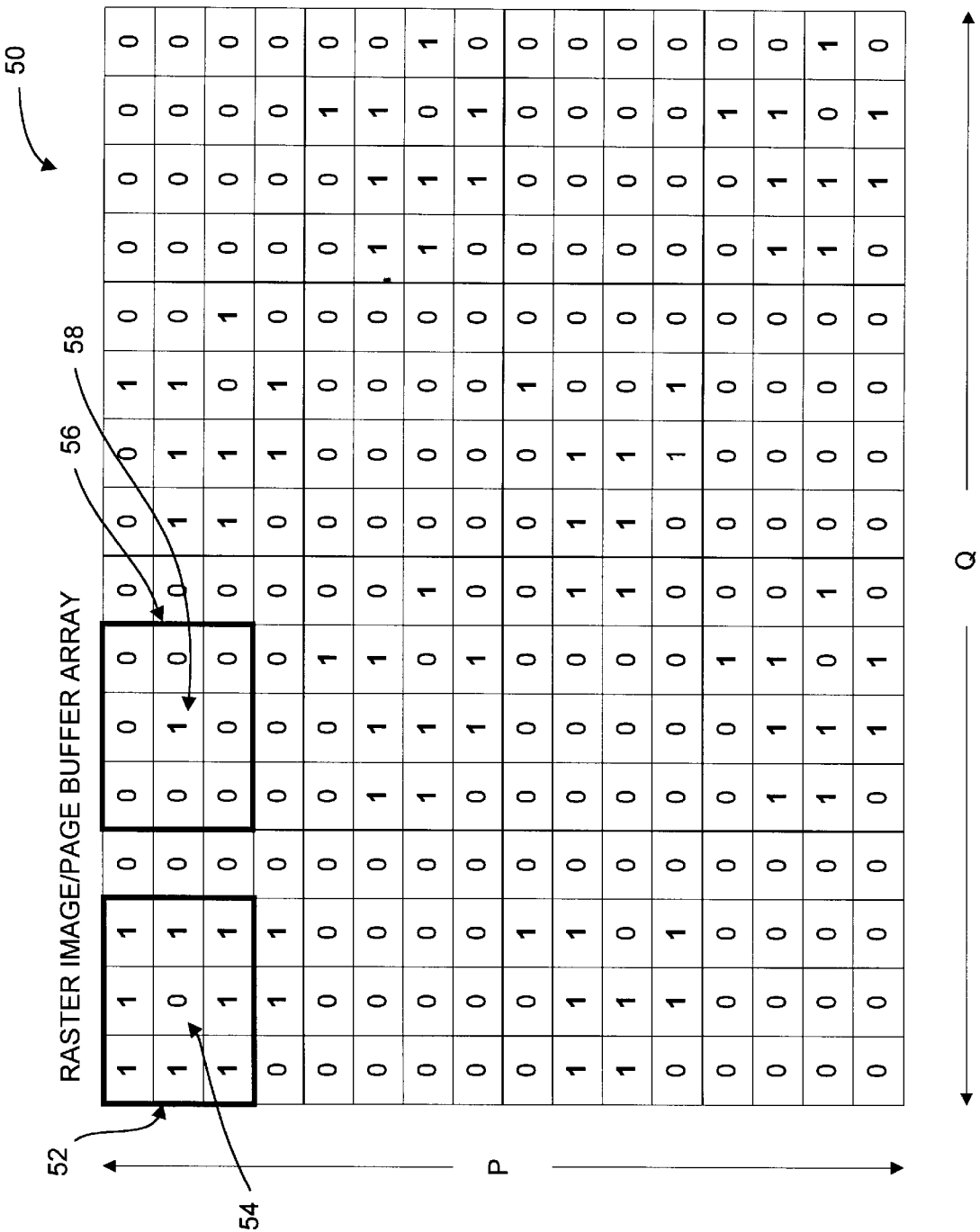
FIG. 3 is a block diagram of a raster image array as generated by a source image having been processed through the dither matrix of FIG. 2.

Referring now to FIG. 3, raster image array 50 (i.e., a page buffer array or bitmap of a portion of raster image 30 in FIG. 1) depicts the resultant raster image after dithering has occurred using dither matrix 40 relative to an arbitrary sample source image (gray value pixel image 28) that has all gray pixel values of 128. Array 50 is a raster pixel image (stored bitmap) from which rendering occurs. Windows 52 and 56 are example sampling/mapping/detection windows (hereinafter "detection" windows) and are depicted as being tiled over raster array 50 within which orphan pixels are found. Although windows 52 and 56 are shown as 3×3 cell/pixel windows, other window configurations are also applicable, such as 5×5 or 1×3, wherein, preferably, a center cell exists.

In raster image array 50, an orphan pixel value has a unique (in this case opposite) pixel value relative to a pixel value of any adjacent pixel within a bounded detection window. In array 50, a pixel is an "orphan" pixel if it has a logical value of "zero" and the pixel value of each adjacent pixel (within the window) is a logical "non-zero" or "one".

A pixel is also an orphan pixel in array 50 if it has a logical value of "non-zero" or "one" and the pixel value of each adjacent pixel (within the window) is a logical "zero". It should be noted here that not all orphan pixels originally in dither matrix 40 remain orphan in the resultant raster image array 50. However, the placement of orphan pixels in dither matrix 40 at least enhances the probability of having and detecting orphan pixels in the resultant raster image array 50, thus improving the chances for discriminating between halftone image data and text/line art image data during rendering.

Further in reference to the two exemplary detection windows 52 and 56 shown tiled over raster image 50, each is shown as a highlighted outline around a prescribed set of 9 pixels for a 3×3 window area. Both windows 52 and 56 are shown simultaneously tiled over raster image 50 for ease of discussion purposes. However, as well known in the art, each window 52 and 56 is representative of a different snap shot in time for rendering different portions of raster image 50. Each 3×3 set of pixels is processed through its respective window 52 or 56. If an orphan bit is found within the window, the pixel data (or, generally, the selected center pixel) is subsequently processed as halftone data. In contrast, if an orphan bit is not found, the pixel data is processed as text/line art data.

For example, window 52 is tiled over a first set of 9 pixels. In this first set, pixel 54 is identified as an orphan pixel because all adjacent pixels (within window 52) have an opposite binary value/state. In this case, orphan pixel 54 has a value (state) of logical "zero", whereas all adjacent pixels have a value of logical "one". In contrast, window 56 is tiled over a second set of pixels wherein pixel 58 is identified as an orphan pixel. In the case of window 56, orphan pixel 58 has a value of "one" and is identified as an orphan because all adjacent pixels (within the window) have a value of "zero".

Although detection windows 52 and 56 depict preferred orphan configurations, i.e., the center cell in the window comprises an orphan bit, the definition of "orphan" is flexible under the present invention. Namely, a pixel may optionally be considered orphan even if it is located in a non-center cell within the detection window, so long as each adjacent cell pixel within the window contains a different or opposite binary value/state relative to the "orphan" pixel. Or, in other words, a pixel may be considered "orphan" regardless of its location within a detection window if it is unique relative to any adjacent pixels. In essence, an orphan cell may be flexibly defined, so long as it is usable/identifiable to distinguish between halftone, text, and/or line art under principles of the present invention. Moreover, an orphan pixel may be defined by any number of bits as conventional in the art for defining pixel values. A multi-bit pixel definition is applicable not only to dither matrix 40, but also to raster image array 50. For example, if raster array 50 embodied two-bit pixel values, an orphan pixel may be identified as a "00" with adjacent pixels being any other combination, such as 01, 10, or 11. Or, an orphan pixel may be identified as a "11" with adjacent pixels being any other combination, such as 00, 01, or 10.

It should be noted here that, typically, the electrophotographic (EP) process is not able to produce a clearly visible "orphan" dot. This is because, for example, in a single "black" dot/pixel configuration (surrounded by "white" pixels), the photoconductive charge is insufficient to attract enough toner to visibly realize the single black dot. In contrast, a single "white" dot configuration (surrounded by "black" dots) is generally blurred into a black dot because of the charge attraction/overlap of the surrounding dots. For these reasons, "orphan" dots are not typically produced in a raster image. Although "orphan" dots are not generally visible in a final output image, they work well to implement the detection scheme of the present invention because they are uniquely identifiable in the raster image prior to rendering.

Figure 4:
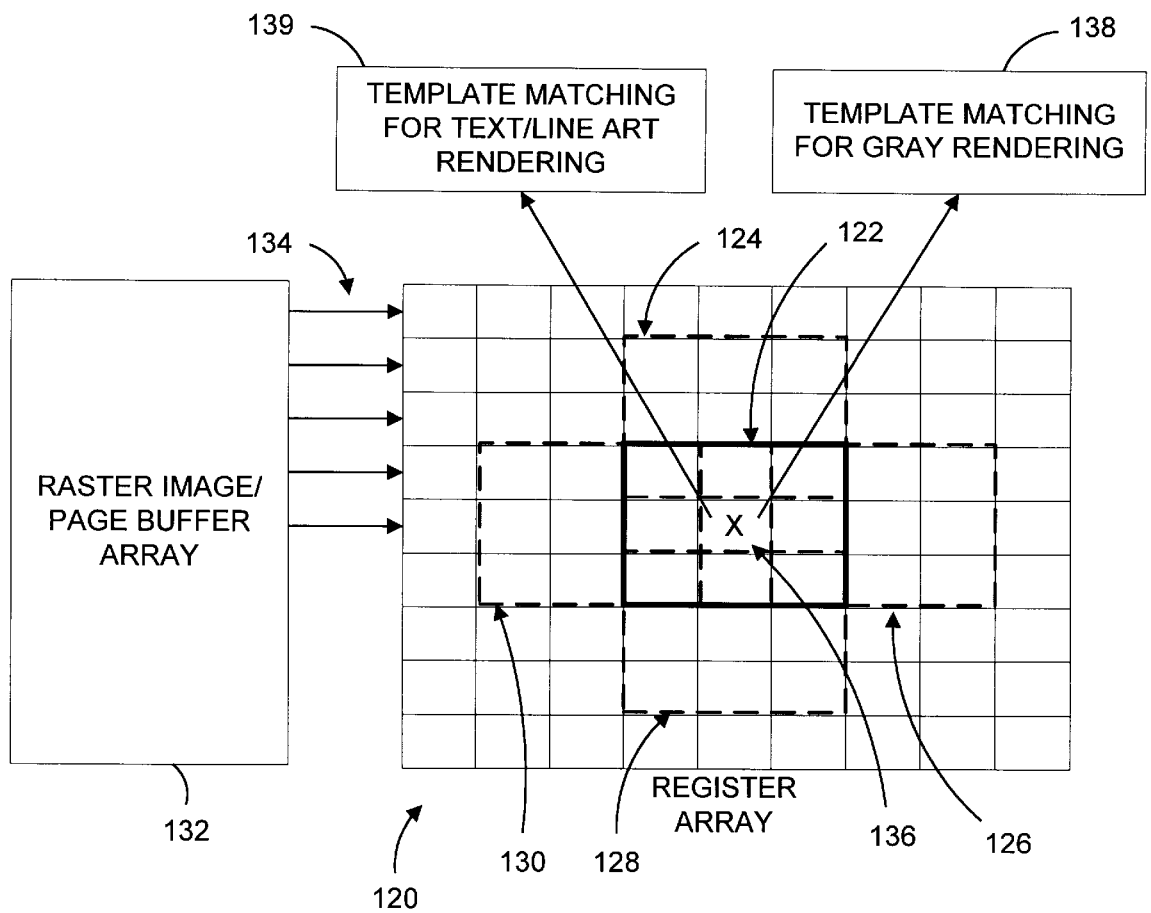
FIG. 4 is a block diagram of a register array having multiple mapping windows for detecting an orphan pixel.

FIG. 4 is a block diagram of register array 120 and raster image array 132, further describing the rendering of data having orphan pixels according to the present invention. Register array 120 is a 9×9 array (for this example) and receives data in a conventional manner from raster image/page buffer array 132 through five line 600 dpi buffers 134. Center bit cell 136 is marked with an "X" to show the active/selected cell for which rendering occurs as data is serially shifted through register array 120.

In the embodiment depicted, register array 120 includes multiple overlapping detection windows 122, 124, 126, 128 and 130 for detecting orphan pixels and for enabling process "switching" for the image data ("switching" will be defined later). For description purposes only, center window 122 is highlighted in a solid line, whereas windows 124, 126, 128 and 130 are highlighted in short dashed lines. Each window 124, 126, 128 and 130 overlaps center window 122 by a single row (or column) of pixels. However, it will be obvious that other single or multiple window configurations are also feasible.

The use of multiple detection windows provides a preferred configuration and method for enhancing the detection of orphan dots relative to the overall data being rendered and for discriminating as to when process "switching" should occur. Specifically, if an orphan pixel is identified within any of the detection windows 122, 124, 126, 128 and 130, or as programmably defined, then the center cell pixel 136 is template matched for gray rendering 138 (halftoning) purposes. In contrast, if no orphan pixel is identified within any of the detection windows, then the center cell is template matched for text/line art rendering 139 purposes. Thus, "switching" means that rendering may occur, selectively, under halftone processing 138 or under text/line art processing 139.

Several options are available for implementing switching preferences. In one embodiment, if an orphan pixel is detected within any designated window, one option is to immediately switch to halftone rendering 138 and then immediately switch back to text/line art rendering when no orphan pixel is detected. On the other hand, if an orphan pixel is detected, another option is to switch to halftone rendering 138, set a counter to a predefined number, and then continue halftone rendering 138 and stepping the counter for each next pixel encountered until the counter has expired. If another orphan pixel is detected before the counter has expired, then the counter is reset. Once the counter expires, then switch back to text/line art rendering. This method provides a buffering effect (or hysteresis type effect) to avoid potentially undesirable fluctuations in process switching between text/line art and/or halftone rendering. A third embodiment includes encoding only the edges of a halftone image with orphan dots so as to allow for detecting an orphan dot and initiating halftone rendering 138 at a first edge of the image, and then subsequently detecting an orphan dot and terminating halftone rendering at a second/opposite edge of the image. Obviously, these three detection/switching schemes are exemplary only, and the details of implementation for a preferred or other detection schemes may vary depending on sensitivity desired and other specific design factors.

Figure 5A:
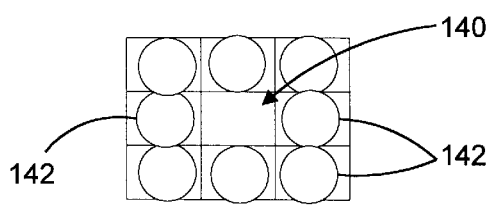
FIGS. 5A–B are block diagram pixel arrays of exemplary orphan dot configurations relative to a mapping window.
Figure 5B:
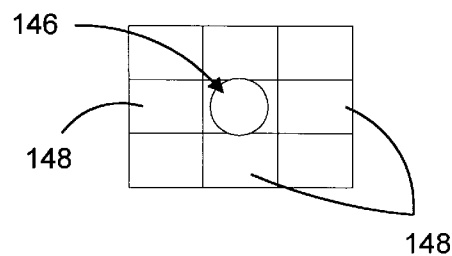

FIGS. 5A–B are block diagrams of exemplary "robust" or most accurate orphan dot configurations. In FIG. 5A, "white" pixel 140 is the orphan dot because it is completely surrounded by opposite value ("black") dots 142. In FIG. 5B, "black" pixel 146 is an orphan dot because it is surrounded by opposite value ("white") dots 148. Other pixel configurations are also feasible for defining an orphan dot as is obvious to those of ordinary skill in the art.

Figure 6:
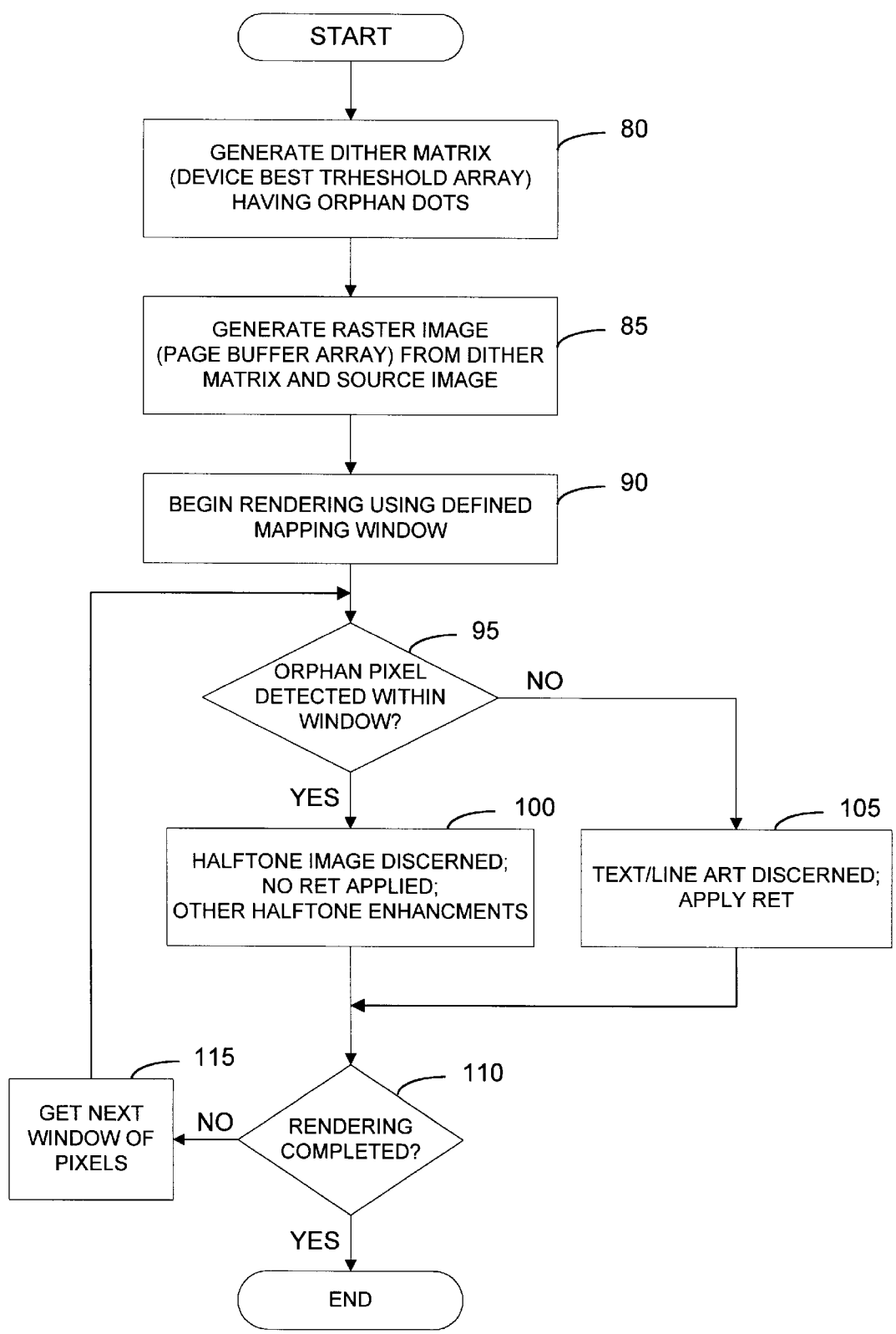
FIG. 6 is a flow chart depicting a preferred method of the present invention.

Referring now to FIG. 6, a flow chart depicts a preferred method of the present invention. First, a dither matrix 40 is generated 80 wherein orphan pixels (dots) are strategically placed to enhance the possibility of having orphan pixels in the resultant raster image 50 for ultimate purposes of discriminating text/line art data from halftone data during rendering. Next, as source image data is processed through the dither matrix, a raster image 50 is generated 85 and the rendering process is begun 90 using one or more defined detection windows. For each set of pixels processed through the detection window(s), any orphan pixels are detected 95. If an orphan pixel is detected, then the image data is deemed to be halftone data 100 and no edge smoothing or resolution enhancement technology (RET) is applied to the active pixel selected for processing (usually a center cell of a detection window). However, other halftone template matching may be selectively applied to enhance the halftone image. On the other hand, if no orphan pixel is detected 95, then the window data is deemed to be text or line art and the active pixel is processed through RET or other resolution enhancement procedures.

Once the active pixel is processed, either as halftone data 100 or text data 105, then the rendering process continues 110, 115, 95, etc., until completed.

Finally, what has been described above are the preferred embodiments of a system and method for discriminating image data as between text/line art and halftone for improved rendering of the data. While the present invention has been described by reference to specific embodiments, it will be apparent that other alternative embodiments and methods of implementation or modification may be employed without departing from the true spirit and scope of the invention.

What is claimed is:

1. A method of rendering a raster pixel image from a stored bitmap, the bitmap having at least one bit per pixel representation, the method comprising:
    (a) determining whether an orphan pixel is detected within one or more bounded windows of the bitmap, the orphan pixel having a pixel value that is unique relative to any adjacent pixel within the one or more bounded windows; and,
    (b) processing at least one selected pixel of the bitmap within the one or more bounded windows relative to the determining of whether an orphan pixel is detected.

2. The method of claim 1 wherein the orphan pixel has an opposite pixel value relative to a pixel value of any adjacent pixel within the one or more bounded windows.

3. The method of claim 1 wherein the orphan pixel is defined, generally, as an isolated white or black pixel in the bitmap.

4. The method of claim 1 wherein, alternatively, (i) the orphan pixel has a pixel value of a logical "zero" in the event a pixel value of each adjacent pixel is a logical "non-zero" within the one or more bounded windows, or (ii) the orphan pixel has a pixel value of a logical "non-zero" in the event a pixel value of each adjacent pixel is a logical "zero" within the one or more bounded windows, or (iii) the orphan pixel has a pixel value of a logical "one" in the event a pixel value of each adjacent pixel is not a logical "one" within the one or more bounded windows.

5. The method of claim 1 further including, in the event an orphan pixel is detected within the one or more windows, processing the at least one selected pixel of the bitmap as a halftone image.

6. The method of claim 5 wherein processing the at least one selected pixel of the bitmap as a halftone image includes extending white to black transitions, increasing gray levels, or modulating the selected pixel to increase imaging process stability and to avoid objectionable patterning.

7. The method of claim 5 wherein processing the at least one selected pixel of the bitmap as a halftone image excludes using an edge enhancement scheme typically used for enhancing text or line art image data.

8. The method of claim 1 further including, in the event an orphan pixel is detected within the one or more windows, processing the at least one selected pixel of the bitmap as a halftone image, and then, alternatively:
    (a) processing next selected pixels as text/line art image data until a next orphan pixel is detected; or,
    (b) processing next selected pixels as halftone image data until a counter expires; or
    (c) processing next selected pixels as halftone image data until a next orphan pixel is detected.

9. The method of claim 1 further including, in the event an orphan pixel is not detected within the one or more windows, processing the at least one selected pixel of the bitmap as text or line art image data.

10. The method of claim 9 wherein processing the at least one selected pixel of the bitmap as text or line art image data includes using a resolution enhancement scheme for enhancing text or line art edges.

11. The method of claim 1 wherein the one or more windows has an area dimension of at least one pixel by three pixels.

12. A method of forming a pixel matrix for a halftone image, the pixel matrix having at least one bit per pixel representation, the method comprising generating a pixel pattern such that an orphan pixel exists within the pattern, wherein the orphan pixel has a pixel value that is unique relative to any adjacent pixel within the pixel pattern.

13. The method of claim 12 wherein, alternatively, (i) the orphan pixel has a pixel value of logical "zero" in the event a pixel value of each adjacent pixel is a logical "non-zero", or (ii) the orphan pixel value is a logical "non-zero" in the event a pixel value of each adjacent pixel is a logical "zero", or (iii) the orphan pixel has a pixel value of a logical "one" in the event a pixel value of each adjacent pixel is not a logical "one" within the one or more bounded windows.

14. The method of claim 12 wherein the orphan pixel is designed into the halftone image.

15. An apparatus for rendering a raster pixel image from a stored bitmap, comprising:
    (a) means for detecting an orphan pixel within one or more bounded windows of the bitmap, the orphan pixel having a pixel value that is unique relative to any adjacent pixel within the bitmap;
    (b) means for processing at least one selected pixel of the bitmap as a halftone image in the event an orphan pixel is detected; and,
    (c) means for processing at least one selected pixel of the bitmap as text or line art image data in the event an orphan pixel is not detected.

16. The apparatus of claim 15 wherein the orphan pixel has a predefined pixel value.

17. The apparatus of claim 15 further including means for generating the stored bitmap such that an orphan pixel is encoded within a pattern of pixels of the bitmap, the encoded orphan pixel defining the pattern of pixels as data for rendering as a halftone image.

18. A method of rendering a raster pixel image from a stored bitmap, the bitmap having at least one bit per pixel representation, the method comprising:
(a) determining whether an orphan pixel is detected within one or more bounded windows of the bitmap, the orphan pixel having a pixel value that is unique relative to any adjacent pixel within the bitmap; and,
(b) in the event an orphan pixel is detected within the one or more windows, processing at least one selected pixel of the bitmap as a halftone image, and in the event an orphan pixel is not detected within the one or more windows, processing at least one selected pixel of the bitmap as text or line art image data.

19. A method of image processing, comprising:
(a) forming a pixel matrix for an image, the pixel matrix embodying a pixel pattern having an orphan pixel encoded within the pattern;
(b) during rendering of the pixel matrix for the image, determining whether the orphan pixel is detected within one or more bounded windows of the pixel matrix; and,
(c) in the event the orphan pixel is detected within the one or more windows, processing at least one selected pixel of the pixel matrix as a halftone image, and in the event the orphan pixel is not detected within the one or more windows, processing at least one selected pixel of the pixel matrix as text or line art image data.

20. A method of forming a pixel matrix for a halftone image, the pixel matrix having at least one bit per pixel representation, the method comprising generating a pixel pattern having an orphan pixel encoded within the pattern, the encoded orphan pixel specifically identifying the pixel pattern as a halftone image for image processing purposes and for identifying the pixel pattern as not text or line art for image processing purposes.

21. An apparatus for rendering a raster pixel image, comprising:
(a) means for generating a bitmap such that an orphan pixel is encoded within a pattern of pixels of the bitmap, the encoded orphan pixel defining the pattern of pixels as data for rendering as a halftone image;
(b) means for detecting the orphan pixel within one or more bounded windows of the bitmap; and,
(c) means for processing at least one selected pixel of the bitmap as a halftone image in the event the orphan pixel is detected.

22. The apparatus of claim 21 further including means for processing at least one selected pixel of the bitmap as text or line art image data in the event the orphan pixel is not detected.

\* \* \* \* \*